United States Patent Office 3,518,952
Patented July 7, 1970

3,518,952
METHOD OF SUBSURFACE BURNING OF QUANTITIES OF REFUSE MATERIAL
John A. Francisovich, Aberdeen, Wash., assignor to Fibre-Weld, Inc., Aberdeen, Wash.
No Drawing. Filed Apr. 28, 1967, Ser. No. 634,463
Int. Cl. F23g 5/00
U.S. Cl. 110—8                        7 Claims

ABSTRACT OF THE DISCLOSURE

The incineration of quantities of refuse material by subsurface burning at high temperatures is attained by injecting fuel in the refuse and igniting it to heat nitrogenous gases to the point of self-sustained burning.

BACKGROUND OF THE INVENTION

One of the major problems associated with garbage dumps, refuse landfills, and the like, is the unsanitary conditions created by their presence and the difficulty and expense in reclaiming the land occupied thereby. One commonly practiced method of reclaiming this land is to burn the refuse, either on a periodic or a continuous basis, in the open air. This, however, substantially contributes to air pollution and is therefore not a desirable solution to the problem. Another commonly practiced method is to create a so-called "sanitary landfill" wherein several inches of dirt is spread across the surface of the refuse periodically so that alternating layers of refuse and dirt are built up over a long period of time. The eventual intent is to permit this landfill area to settle and then build on it. This, however, requires many years of settling, during which water run off from the landfill creates a sanitation hazard, and therefore also is not a desirable solution to the problem.

In brief, the present invention comprises a method for incinerating combustibles, domestic rubbish, commercial and industrial refuse and garbage in large quantities such as are found in refuse landfills or garbage dumps. Fuel is injected into a refuse landfill or dump to a selected location beneath the landfill or dump surface where nitrogenous gases have been created by natural decay of the vegetable and animal refuse material. The fuel is ignited in the selected subsurface region to heat the nitrogenous gases to the point of combustion to effect self-sustained burning of the refuse material beneath the landfill or dump surface. This process eliminates most of the problems connected with present inefficient methods of disposal of solid wastes; namely scenic blights, serious hazards to the public health, including pollution of air and water resources, accident hazards, increase in rodent and insect vendors of disease, adverse effects on land values, and creation of public nuisances.

Inasmuch as greater volumes of nitrogenous gases resulting from decaying refuse material are likely to be created in older, more compacted regions of a refuse landfill or garbage dump, the landfill should be probed to locate the most appropriate region to begin the subsurface ignition of the landfill. One convenient means of locating those regions having concentrations of nitrogenous gases is to insert a pipe into the landfill and test the gases that pass therethrough by any one of a number of known procedures.

Although any subsurface region containing nitrogenous gases is suitable, such subsurface regions located near the edges of the landfill are preferred because of their accessibility. When a suitable region is found, for example one near a landfill edge, a tunnel is bored into the landfill at the base thereof. This tunnel need only be large enough to pass a fuel burner, and in general need only be a few feet in length. The burner, preferably ignited, is then inserted into the tunnel to heat the nitrogenous gases to a sufficiently high temperature to ignite them.

It has been discovered that these nitrogenous gases must attain a temperature on the order of 2000–3000° F. or more to produce self-sustained burning of the refuse material. Therefore, the fuel must have a relatively high heat content when ignited.

Once refuse burning becomes self-sustaining the burner is removed. The subsurface burning front progresses away from the ignition point in all directions thereby forming a subsurface cavity. As this cavity enlarges, the sides and top thereof fall in and are consumed as the front progresses inward. If non-combustible objects such as bathtubs, etc. impede the advance of the burning front, the fuel in liquid form and under pressure could be sprayed into the cavity to aid the burning front in circumventing the object. For reasons such as this, it is preferred that the igniting fuel be provided in liquid form.

The size of the burning subsurface cavity can become quite large. In one instance a landfill section of a depth on the order of 15–20 feet was substantially consumed before the walls thereof caved in and were consumed.

The heat generated in this method once refuse burning is self-sustaining has been found to be of sufficient intensity to melt glass bottles and tin cans and consume all other objects discarded in refuse and garbage dumps with the exception of heavy metal which can be salvaged as clean scrap. Under such high temperature conditions, little smoke is created and what little is created has been traced to the presence of such materials as wood, rags, rope, rubber and bedding. Once the point of rapid oxidation is reached and provided the fill has been properly covered by dirt even the burning of these materials will contribute very little smoke. The smoke and gases arising from surface cracks in the fill cover, due to the high temperatures or rodent trails for example, are primarily steam vapors. Any such smoke and steam vapors can be contained at eye level through the use of a fog spray nozzle. The water emanating from the fog spray nozzle could contain a solution of ortho-phosphoric acid, the sodium salt of dodecylbenzenesulphonic acid and a nonionic detergent, which would destroy any bacteria which might become airborne.

The method of this invention is particularly suitable for so-called "sanitary landfills" where several inches of dirt are typically spread over the garbage to minimize stench and health hazards, and where the garbage is highly compacted as by garbage trucks traveling back and forth across the surface thereof. Under these conditions, the high intensity burning front characteristic of this invention advances more rapidly and can be controlled more easily than under conditions associated with loosely compacted landfills.

A preferred liquid igniting fuel comprises diesel oil containing a small proportion of an emulsion that promotes the attaining of high temperatures in subsurface refuse burning. The emulsion comprises a sodium hydroxide-water solution admixed with chlorine and maintained in suspension with the diesel oil by means of a suitable dispersant and emulsifying agent. It is preferred that the emulsion diesel oil ratio be about 1:20 on a volume basis.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and The embodiments of the invention in which an exclusive property or privilege is claimed are defined as follows:

1. A method of incinerating refuse material in large quantities comprising
   boring a tunnel into the refuse material to reach subsurface regions in the refuse material having concentrations of nitrogenous gases resulting from decay of vegetable and animal matter,
   inserting a fuel burner into the tunnel, the fuel burner holding a fuel mixture containing an oxidizer for the fuel, for igniting the nitrogenous gases in the subsurface region, and
   igniting the fuel mixture in the subsurface region to heat the nitrogenous gases in the subsurface regions to the point of combustion to effect self-sustained burning of the refuse material.

2. The method of claim 1 wherein the fuel mixture is ignited prior to insertion of the fuel burner into the tunnel.

3. The method of claim 1 including removing the fuel burner from the subsurface region once burning of the refuse material becomes self-sustaining.

4. A method according to claim 1 wherein the fuel mixture, when ignited, is sufficient to heat the nitrogenous gases in said subsurface region to a temperature of 2,000° F., or more.

5. A method according to claim 1 including spraying into said subsurface region after ignition of the nitrogenous gases a liquid fuel mixture containing an oxidant to further promote a sufficiently high temperature to effect self-sustaining subsurface burning.

6. A method according to claim 1 wherein said fuel mixture comprises diesel oil and an aqueous mixure of sodium hydroxide and chlorine.

7. A method according to claim 6 wherein the fuel mixture includes an emulsifier.

References Cited

UNITED STATES PATENTS

| | | | |
|---|---|---|---|
| 526,283 | 9/1894 | Anderson | 110—8 |
| 1,509,027 | 9/1924 | Phillips | 110—21 |
| 2,871,941 | 2/1959 | Allen et al. | 166—38 |
| 3,322,194 | 5/1967 | Strobhar | 166—11 |
| 3,334,598 | 8/1967 | Overfield | 110—18 |

KENNETH W. SPRAGUE, Primary Examiner